United States Patent
Sharma

(10) Patent No.: US 11,082,312 B2
(45) Date of Patent: Aug. 3, 2021

(54) SERVICE CHAINING SEGMENTATION ANALYTICS

(71) Applicant: Cisco Technology, Inc., San Jose, CA (US)

(72) Inventor: Samar Sharma, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 30 days.

(21) Appl. No.: 16/112,858

(22) Filed: Aug. 27, 2018

(65) Prior Publication Data

US 2019/0104040 A1 Apr. 4, 2019

Related U.S. Application Data

(60) Provisional application No. 62/567,907, filed on Oct. 4, 2017.

(51) Int. Cl.
| | |
|---|---|
| *H04L 12/26* | (2006.01) |
| *H04L 12/24* | (2006.01) |
| *H04L 29/06* | (2006.01) |
| *H04L 12/803* | (2013.01) |
| *H04L 12/721* | (2013.01) |
| *H04L 12/725* | (2013.01) |

(52) U.S. Cl.
CPC ........ *H04L 43/062* (2013.01); *H04L 41/0806* (2013.01); *H04L 43/0876* (2013.01); *H04L 45/70* (2013.01); *H04L 47/125* (2013.01); *H04L 63/101* (2013.01); *H04L 41/0893* (2013.01); *H04L 45/306* (2013.01)

(58) Field of Classification Search
CPC ............... H04L 43/062; H04L 41/0806; H04L 43/0876; H04L 47/125; H04L 63/101; H04L 45/306; H04L 41/0893
See application file for complete search history.

(56) References Cited

U.S. PATENT DOCUMENTS

| | | | |
|---|---|---|---|
| 6,175,874 B1 | 1/2001 | Imai et al. | |
| 6,182,097 B1 | 1/2001 | Hansen et al. | |
| 6,259,705 B1 | 7/2001 | Takahashi | |
| 6,601,084 B1 | 7/2003 | Bhaskaran et al. | |
| 6,643,260 B1 | 11/2003 | Kloth et al. | |
| 6,683,873 B1 | 1/2004 | Kwok et al. | |
| 6,721,800 B1 | 4/2004 | Basso et al. | |
| 6,735,631 B1 | 5/2004 | Oehrke et al. | |

(Continued)

OTHER PUBLICATIONS

Zhang, et al., "L4-L7 Service Function Chaining Solution Architecture", Open Networking Foundation, Version 1.0, ONF TS-027, Open Flow, Jun. 14, 2015, 36 pgs.

(Continued)

*Primary Examiner* — Walter J Divito
*Assistant Examiner* — Anthony Luo
(74) *Attorney, Agent, or Firm* — Edell, Shapiro & Finnan, LLC

(57) ABSTRACT

Presented herein are service chaining techniques for selective traffic redirection based on Access Control List (ACL) configurations on switches. Network traffic forwarded along one or more service chains may be monitored on the basis of individual segments of the service chains. In one example, the network traffic forwarded along individual segments may be counted on a per-segment basis.

20 Claims, 16 Drawing Sheets

(56) References Cited

U.S. PATENT DOCUMENTS

| | | |
|---|---|---|
| 6,779,039 B1 | 8/2004 | Bommareddy et al. |
| 6,996,615 B1 | 2/2006 | McGuire |
| 7,062,571 B1 | 6/2006 | Dale et al. |
| 7,284,053 B1 | 10/2007 | O'Rourke et al. |
| 7,313,667 B1 | 12/2007 | Pullela et al. |
| 7,328,237 B1 | 2/2008 | Thubert et al. |
| 7,536,476 B1 | 5/2009 | Alleyne |
| 7,542,423 B1 | 6/2009 | Morishige et al. |
| 7,567,504 B2 | 7/2009 | Darling et al. |
| 7,623,455 B2 | 11/2009 | Hilla et al. |
| 7,808,897 B1 | 10/2010 | Mehta et al. |
| 7,852,774 B2 | 12/2010 | Shen et al. |
| 8,014,278 B1 | 9/2011 | Subramanian et al. |
| 8,259,722 B1 | 9/2012 | Kharitonov |
| 8,284,664 B1 | 10/2012 | Aybay et al. |
| 8,301,645 B1 | 10/2012 | Crook |
| 8,467,294 B2 | 6/2013 | Raman et al. |
| 8,510,469 B2 | 8/2013 | Portolani |
| 8,553,552 B2 | 10/2013 | Hu et al. |
| 8,611,356 B2 | 12/2013 | Yu et al. |
| 8,868,726 B1 | 10/2014 | Tu et al. |
| 8,937,942 B1 | 1/2015 | Li et al. |
| 9,178,807 B1 | 11/2015 | Chua et al. |
| 9,246,998 B2 | 1/2016 | Kumar et al. |
| 9,258,243 B2 | 2/2016 | Guichard et al. |
| 9,397,946 B1 | 7/2016 | Yadav |
| 9,432,294 B1 | 8/2016 | Sharma et al. |
| 9,444,744 B1 | 9/2016 | Sharma et al. |
| 9,565,135 B2 | 2/2017 | Li et al. |
| 9,755,959 B2 | 9/2017 | Guichard et al. |
| 9,825,865 B1 | 11/2017 | Sharma et al. |
| 9,853,898 B1 | 12/2017 | Subramanian et al. |
| 10,108,791 B1 | 10/2018 | Masterman et al. |
| 2002/0184368 A1 | 12/2002 | Wang |
| 2003/0056001 A1 | 3/2003 | Mate et al. |
| 2003/0097405 A1 | 5/2003 | Laux et al. |
| 2004/0004941 A1 | 1/2004 | Malan et al. |
| 2004/0258062 A1 | 12/2004 | Narvaez |
| 2004/0264481 A1 | 12/2004 | Darling et al. |
| 2004/0267920 A1 | 12/2004 | Hydrie et al. |
| 2005/0027858 A1 | 2/2005 | Sloth et al. |
| 2005/0125424 A1 | 6/2005 | Herriott et al. |
| 2005/0207420 A1 | 9/2005 | Shanklin |
| 2005/0249199 A1 | 11/2005 | Albert et al. |
| 2005/0281205 A1 | 12/2005 | Chandwadkar et al. |
| 2005/0281257 A1 | 12/2005 | Yazaki et al. |
| 2006/0098573 A1 | 5/2006 | Beer et al. |
| 2006/0104286 A1 | 5/2006 | Cheriton |
| 2006/0133371 A1 | 6/2006 | Matoba et al. |
| 2006/0155875 A1 | 7/2006 | Cheriton |
| 2006/0227705 A1 | 12/2006 | Chandwadkar et al. |
| 2007/0016670 A1 | 1/2007 | Cooper |
| 2007/0165622 A1 | 7/2007 | O'Rourke et al. |
| 2008/0084860 A1 | 4/2008 | Dharwadkar |
| 2009/0135722 A1 | 5/2009 | Boers et al. |
| 2009/0198724 A1 | 8/2009 | Valimaki et al. |
| 2009/0304007 A1 | 12/2009 | Tanaka et al. |
| 2010/0251128 A1 | 9/2010 | Cordasco |
| 2011/0055470 A1 | 3/2011 | Portolani |
| 2011/0110382 A1 | 5/2011 | Jabr et al. |
| 2011/0116443 A1 | 5/2011 | Yu et al. |
| 2011/0235508 A1 | 9/2011 | Goel et al. |
| 2011/0261811 A1 | 10/2011 | Battestilli et al. |
| 2011/0283013 A1 | 11/2011 | Grosser et al. |
| 2012/0163164 A1 | 6/2012 | Terry et al. |
| 2012/0163180 A1 | 6/2012 | Goel |
| 2012/0188891 A1 | 7/2012 | Vaelimaa et al. |
| 2012/0201135 A1 | 8/2012 | Ding et al. |
| 2012/0246637 A1 | 9/2012 | Kreeger et al. |
| 2012/0303809 A1 | 11/2012 | Patel et al. |
| 2012/0317276 A1 | 12/2012 | Muniraju |
| 2013/0044636 A1 | 2/2013 | Kopenen et al. |
| 2013/0201989 A1 | 8/2013 | Hu et al. |
| 2013/0235868 A1 | 9/2013 | Owens et al. |
| 2013/0272305 A1 | 10/2013 | Lefebvre et al. |
| 2013/0298243 A1 | 11/2013 | Kumar et al. |
| 2013/0343408 A1 | 12/2013 | Cook et al. |
| 2014/0006535 A1 | 1/2014 | Reddy |
| 2014/0019602 A1 | 1/2014 | Murthy et al. |
| 2014/0025986 A1 | 1/2014 | Kalyanaraman et al. |
| 2014/0075108 A1 | 3/2014 | Dong et al. |
| 2014/0233564 A1 | 8/2014 | Lue et al. |
| 2014/0282611 A1 | 9/2014 | Campbell et al. |
| 2014/0307553 A1 | 10/2014 | Fung |
| 2014/0307580 A1 | 10/2014 | Fung |
| 2014/0321462 A1 | 10/2014 | Kancherla et al. |
| 2014/0341029 A1 | 11/2014 | Allan et al. |
| 2014/0372567 A1 | 12/2014 | Ganesh et al. |
| 2015/0081762 A1 | 3/2015 | Mason et al. |
| 2015/0085870 A1 | 3/2015 | Narasimha et al. |
| 2015/0117458 A1 | 4/2015 | Gurkan et al. |
| 2015/0124815 A1 | 5/2015 | Beliveau et al. |
| 2015/0200838 A1* | 7/2015 | Nadeau ............... H04B 10/27 398/58 |
| 2015/0207741 A1 | 7/2015 | Luo et al. |
| 2015/0215819 A1 | 7/2015 | Bosch et al. |
| 2015/0355946 A1 | 12/2015 | Kang |
| 2015/0381560 A1 | 12/2015 | Chippa et al. |
| 2016/0087887 A1 | 3/2016 | Fung |
| 2016/0094643 A1 | 3/2016 | Jain et al. |
| 2016/0134503 A1* | 5/2016 | Watson ............... H04L 43/026 709/224 |
| 2016/0182378 A1 | 6/2016 | Basavaraja et al. |
| 2016/0182379 A1 | 6/2016 | Mehra et al. |
| 2016/0212048 A1 | 7/2016 | Kaempfer et al. |
| 2016/0218918 A1 | 7/2016 | Chu et al. |
| 2016/0241436 A1 | 8/2016 | Fourie et al. |
| 2016/0241491 A1 | 8/2016 | Tripathi et al. |
| 2016/0251607 A1 | 9/2016 | Kloos |
| 2016/0261497 A1 | 9/2016 | Arisoylu et al. |
| 2016/0269295 A1 | 9/2016 | A S et al. |
| 2016/0283290 A1 | 9/2016 | Porat |
| 2016/0316005 A1 | 10/2016 | Thirumurthi et al. |
| 2016/0345814 A1 | 10/2016 | Thirumurthi et al. |
| 2016/0328159 A1 | 11/2016 | Coddington et al. |
| 2016/0337244 A1 | 11/2016 | Baveja et al. |
| 2017/0171343 A1 | 1/2017 | Venkataramanan et al. |
| 2017/0031704 A1 | 2/2017 | Sudhakaran et al. |
| 2017/0093670 A1 | 3/2017 | Dinan et al. |
| 2017/0118069 A1 | 4/2017 | Sharma et al. |
| 2017/0118088 A1 | 4/2017 | Koizumi et al. |
| 2017/0118116 A1 | 4/2017 | Baveja et al. |
| 2017/0149632 A1 | 5/2017 | Saltsidis et al. |
| 2017/0214719 A1 | 7/2017 | Mohan et al. |
| 2017/0301165 A1* | 10/2017 | GrandPre ........... G07C 9/00571 |
| 2018/0091420 A1 | 3/2018 | Drake et al. |
| 2018/0317093 A1* | 11/2018 | Li ......................... H04W 16/14 |
| 2018/0331912 A1* | 11/2018 | Edmison ............... H04L 43/12 |

OTHER PUBLICATIONS

Kumbhare, et al., "Opendaylight Service Function Chaining Use-Cases", Ericsson, OpenDaylight SFC Use Cases, Oct. 14, 2014, 25 pgs.

Su, et al., "An OpenFlow-based Dynamic Service Chaining Approach for Hybrid Network Functions Virtualization", Proceedings of the 4th IIAE International Conference on Industrial Application Engineering 2016, DOI: 10.12792/iciac2016.019, The Institute of Industrial Applications Engineers, Japan, Mar. 26-30, 2016, 6 pgs.

Blendin, et al., "Position Paper: Software-Defined Network Service Chaining", European Workshop on Software Defined Networks, Sep. 2014, 6 pgs.

Samar Sharma, "Catena", https://blogs.cisco.com/datacenter/catena, Mar. 27, 2017, 8 pages.

"Cisco Nexus 7000 Series Switches Command Reference: The Catena Solution", Feb. 14, 2017, 48 pages.

"Cisco Nexus 7000 Series Switches Configuration Guide: The Catena Solution", Dec. 21, 2016, 28 pages.

Karadeniz, et al., "Hardware Design and Implementation of a Network-on-Chip Based Load Balancing Switch Fabric," IEEE, 2012 International Conference on Reconfigurable Computing and FPGAs, Dec. 2012, 7 pages.

(56) References Cited

OTHER PUBLICATIONS

Wang, et al., "Load-Balancing Behind Switch Fabrics," EE Times, designlines, Wireless & Networking, Design How-To, Sep. 25, 2001, 5 pages.

Parissis, Booking.com, "Distributed Load Balancing, Real Case Example Using Open Source on Commodity Hardware," LinuxConf Berlin, Oct. 2016, 20 pages.

\* cited by examiner $$\sum_{\forall_i} (ACL_{1i}\ COUNT)$$

$$\sum_{\forall_i} (ACL_{1i}\ COUNT)$$
$$\forall = \text{"FOR ALL"}$$

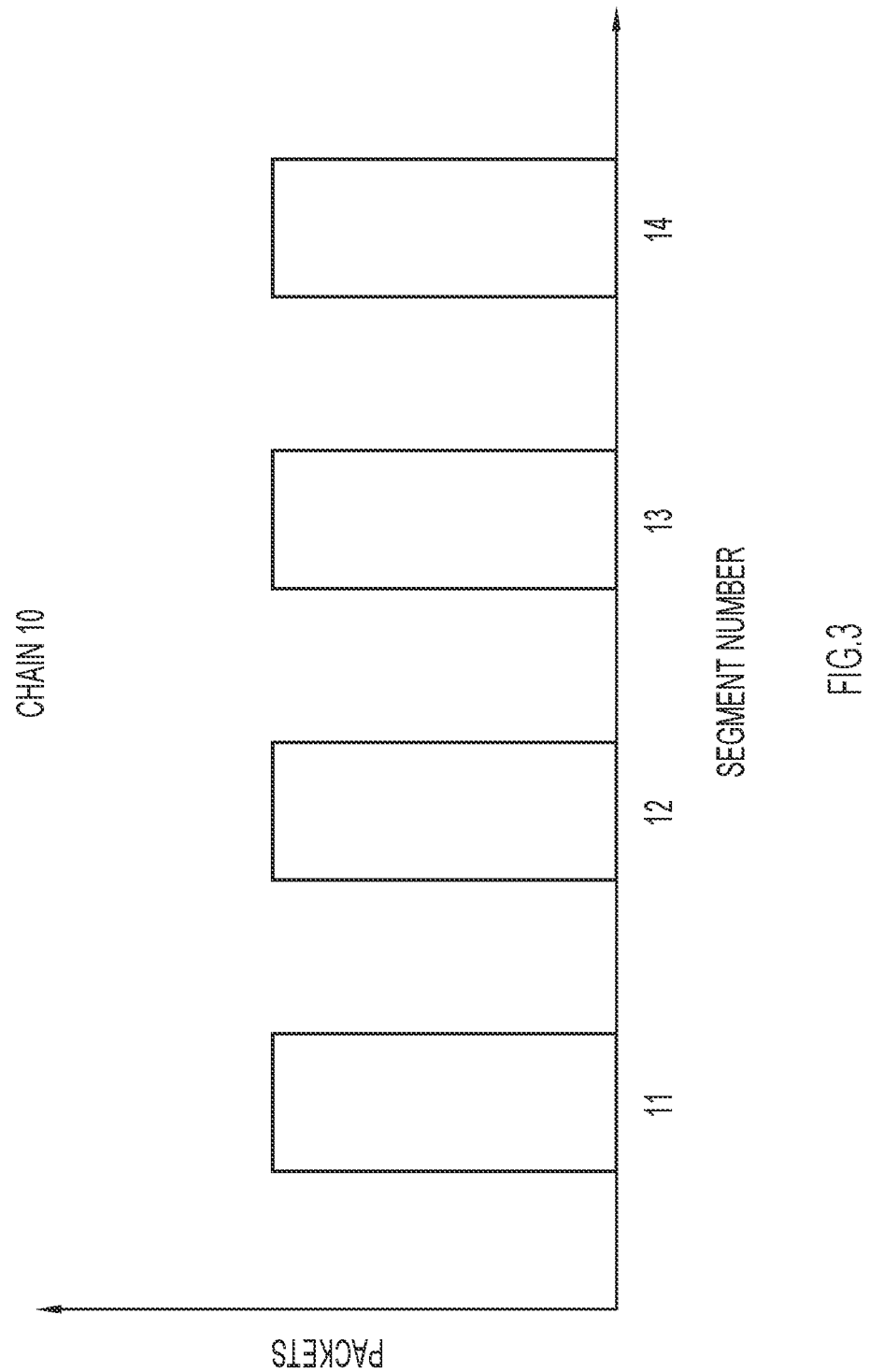

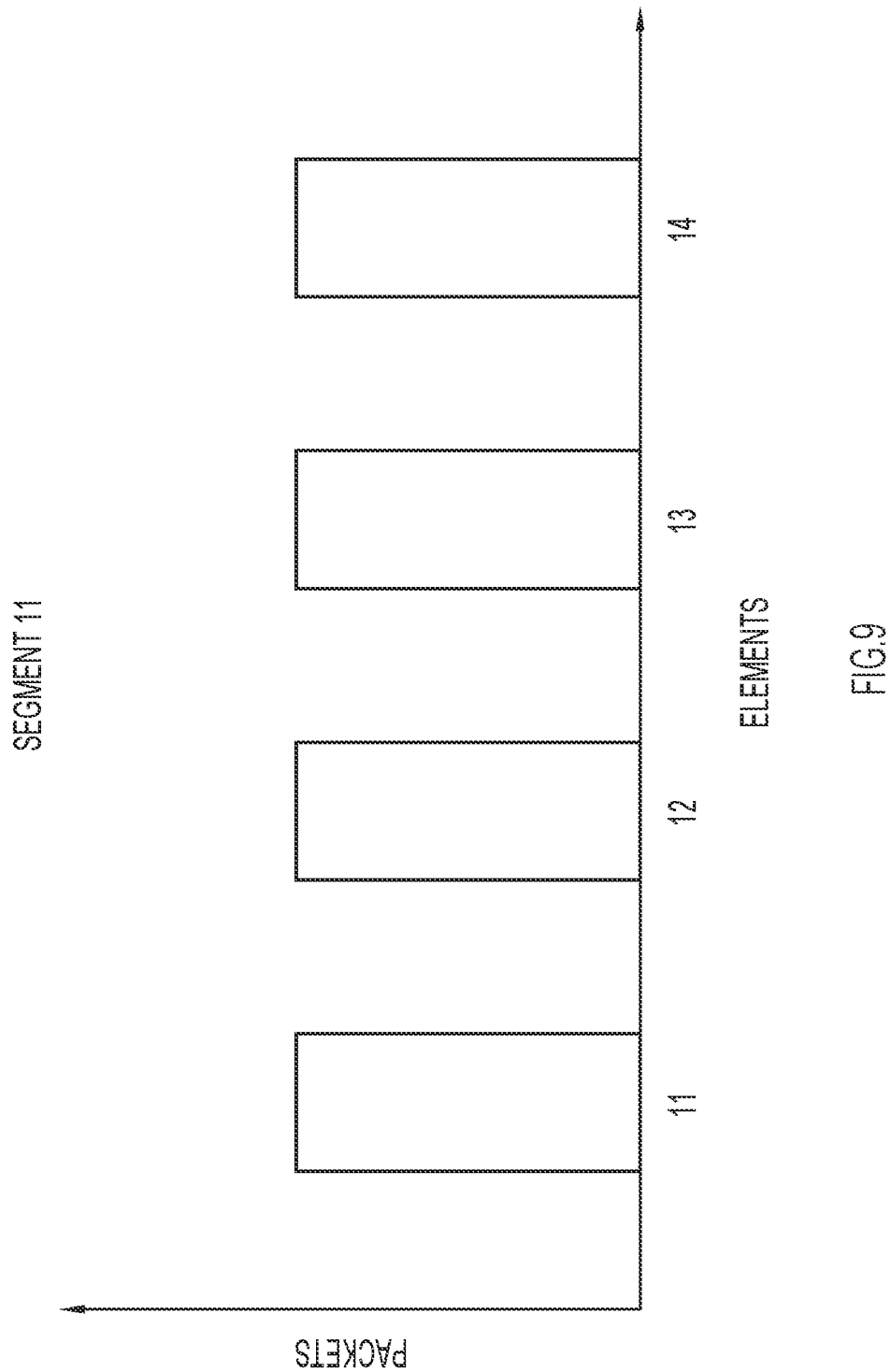

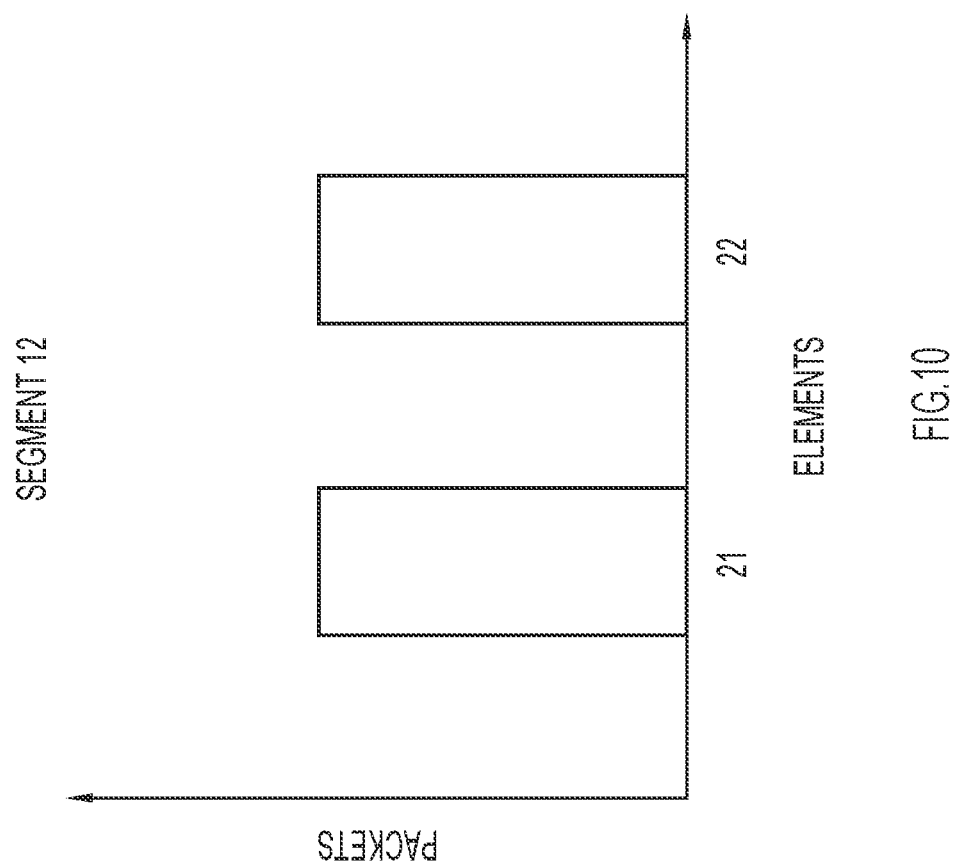

$$\sum_{\forall_{i,j}} E_{ij} \text{ CHAIN 10 TRAFFIC}$$

FIG.11A $$\sum_{\forall_i} S_{1i} \text{ TRAFFIC}$$

FIG.11B $$\sum_{\forall_i} (APP_i \text{ TRAFFIC FOR CHAIN})$$

FIG.11C $$\sum_{\forall_i} (E_{1i} \text{ TRAFFIC})$$

FIG.11D $$\sum_{\forall_i} (E_{11} \text{ TRAFFIC FOR CHAIN})$$

FIG.11E

CHAIN 10

CHAIN 20

$$\sum_{\forall_{j,l}} COUNT_{ij1l}$$

FIG.14A $$\sum_{\forall_{j}} COUNT_{ij11}$$

FIG.14B $$\sum_{\substack{\forall_{j} \\ \forall_{k}}} COUNT_{ij1k}$$

$\forall_k$ SUCH THAT BUCKET $LB_{ik}$ IS MAPPED TO $ELEMENT_{i1}$

FIG.14C $$\sum_{\forall_{i,j,l}} COUNT_{ij1l}$$

i = CHAIN NUMBER, j = ACE NUMBER, l = ELEMENT NUMBER IN $DG_i$

FIG.14D $$\sum_{\forall_{i,j}} COUNT_{ij1k}$$

$\forall_k$ SUCH THAT BUCKET $LB_{ik}$ IS MAPPED TO $ELEMENT_{i1}$

FIG.14E

SERVICE CHAINING SEGMENTATION ANALYTICS

PRIORITY CLAIM

This application claims priority to U.S. Provisional Patent Application No. 62/567,907, filed Oct. 4, 2017, the entirety of which is incorporated herein by reference.

TECHNICAL FIELD

This disclosure relates in general to the field of communications and, more particularly, to service chaining without any additional packet headers.

BACKGROUND

End users have more communications choices than ever before. A number of prominent technological trends are currently afoot (e.g., more computing devices, more online video services, more Internet video traffic), and these trends are changing the network delivery landscape. One of these trends is service chaining. Service chaining is an emerging set of technologies and processes that enable operators to configure network services dynamically in software without having to make changes to the network at the hardware level.

BRIEF DESCRIPTION OF THE DRAWINGS

FIGS. 3-7 are charts illustrating different segment-based analytics that be generated, according to an example embodiment.

FIGS. 9 and 10 are charts of different segment-based analytics for the network environment shown in FIG. 8, according to an example embodiment.

FIGS. 11A-11E illustrate different analytics computations that may be performed, according to an example embodiment.

FIGS. 14A-14E illustrate still further different analytics computations that may be performed, according to an example embodiment.

DESCRIPTION OF EXAMPLE EMBODIMENTS

Overview

Presented herein are service chaining techniques for selective traffic redirection based on Access Control List (ACL) configurations on switches. Network traffic forwarded along one or more service chains may be monitored on the basis of individual segments of the service chains. In one example, the network traffic forwarded along individual segments may be counted on a per-segment basis.

In one embodiment, a method is provided that involves storing, in at least one hardware module of a network device having a plurality of ports, attributes for at least one access control list and associated actions that cause network packets received at one of the plurality of ports that match the attributes for the at least one access control list, to be directed into one or more service chains. Each service chain includes one or more applications and a plurality of segments. Each segment represents a portion of a service chain between an ingress port of the network device to a first application of a service chain, a portion between successively applied applications of a chain, or a portion between a last application of a service chain and an egress port of the network device. Networks packets received at the network device that match the attributes for the at least one access control list into the service chain. The network packets through respective segments of each of the one or more service chains are counted. Based on the counting, analytics are generated of network traffic for each segment of each of the one or more service chains.

Example Embodiments

Presented herein are techniques for service chaining without any additional packet headers. This allows for health monitoring and automatic failure handling and transparent insertion of appliances (configurations not required) with wire-speed performance. These techniques may be implemented on existing Application Specific Integrated Circuits (ASICs) and linecards in datacenter switches, and allow for selective traffic redirection based on ACL configuration. For example, if traffic matches an entry in an ACL, that traffic may be forwarded as indicated in the ACL, e.g., to an application configured to provide one or more network services. As provided herein, redirecting traffic based on ACL configuration also permits segmentation-based service chaining monitoring and analysis.

Figure 1:
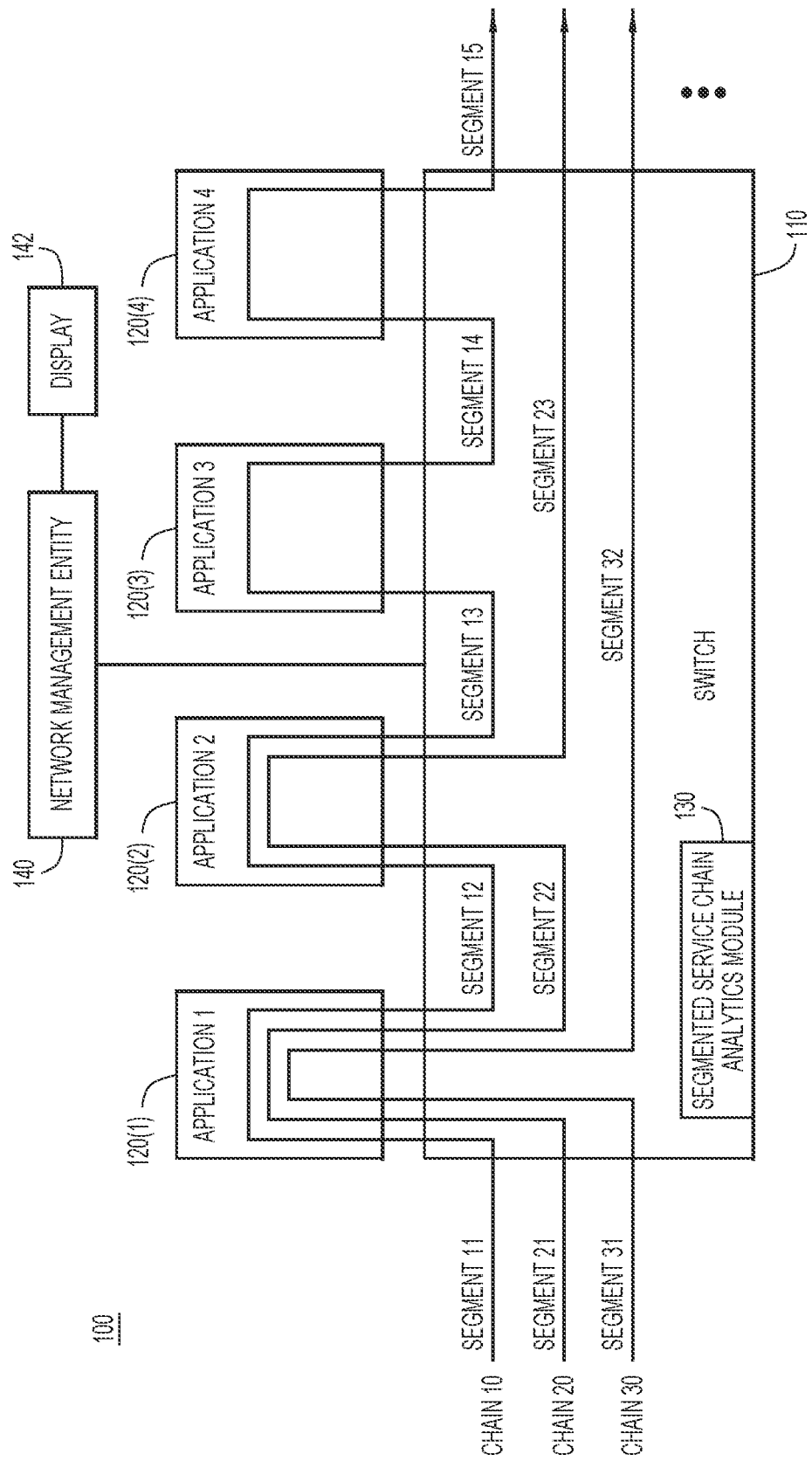
FIG. 1 is a block diagram of a network environment configured to generate analytics segmented service chaining deployments, according to an example embodiment.

FIG. 1 is a block diagram of a network environment 100 configured for generating analytics for segmented service chains. The network environment includes a switch 110 and four applications (Application 1, Application 2, Application 3, and Application 4) shown at reference numerals 120(1)-120(4), respectively. Each application may be configured to perform a network service function, and the switch 110 may be configured to forward network traffic to one or more of the applications 120(1)-120(4) as indicated in an ACL configured on the switch 110.

FIG. 1 further shows that there is a network management entity 140 in communication with switch 110, and in general, the network environment 100 may include a plurality of switches, each of which is in communication with the network management entity 140. The network management entity 140 may take the form of a software application running in the cloud or on a dedicated server computer that is configured to receive analytics from the switches in the network environment 100 in order to manage configurations on a given switch and also manage applications of the one or more service chains supported by a given switch in the network environment 100. The network management entity 140 may be connected to, or have integrated therewith, a display 142 for display analytics data obtained from the switch 110.

The path that each type of network traffic follows through the application(s) and switch is referred to as a service chain (or "chain"). FIG. 1 illustrates three different chains for three different types of network traffic. Chain 10 includes all four applications 120(1)-120(4), chain 20 includes only applications 120(1) and 120(2), and chain 30 includes only application 120(1).

Each chain includes one or more segments. Chain 10 includes segments 11, 12, 13, and 14. Segment 11 represents the portion of chain 10 before the first type of network traffic enters application 1. Segment 12 represents the portion of chain 10 between applications 1 and 2. Segment 13 represents the portion of chain 10 between applications 2 and 3. Segment 14 represents the portion of chain 10 between applications 3 and 4. Similarly, chain 20 includes segments 21 and 22. Segment 21 represents the portion of chain 20 before the second type of network traffic enters application 1. Segment 22 represents the portion of chain 20 between applications 1 and 2. Chain 30 also includes segment 31, which represents the portion of chain 30 before the third type of network traffic enters application 1. Segment 15 represents the portion of chain 10 from Application 4 and egress of the switch 110, segment 23 represents the portion of chain 20 from Application 2 and egress of the switch 110, and segment 32 represents the portion of chain 30 from Application 1 and egress of the switch 110.

In general, a segment represents a portion of a service chain between an ingress port/interface of the switch to a first application of a service chain, a portion between consecutive applications of a multi-application service chain, or a portion between a last application of a service chain and an egress port/interface of the switch 110.

Figures 2A, 2B, 2C:
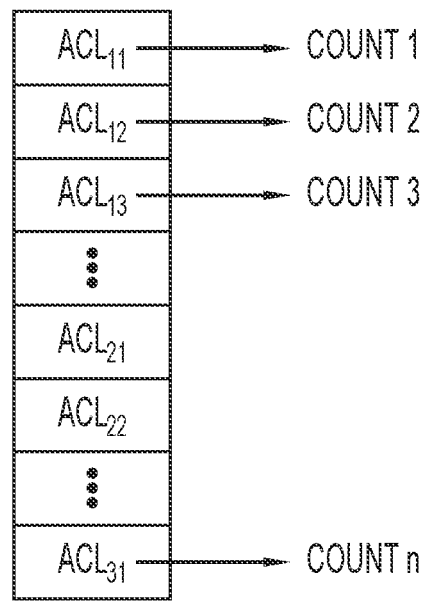
FIG. 2A illustrates an access control list hit counter arrangement used for generating service chain segment counts, according to an example embodiment.
FIGS. 2B and 2C illustrate analytics computations that may be performed using the output of the hit counters shown in FIG. 2A, according to an example embodiment.

The network traffic may be forwarded to applications 120(1), 120(2), 120(3), and/or 120(4) based on an indication in an ACL configured on the switch 110. For example, as shown in FIG. 2A, for chain 10, if the first type of network traffic matches $ACL_{11}$, that network traffic may be directed along segment 11 (i.e., to application 1); if the first type of network traffic matches $ACL_{12}$, it may be directed along segment 12; if the first type of network traffic matches $ACL_{13}$, it may be directed along segment 13; and if the first type of network traffic matches $ACL_{14}$, it may be directed along segment 14. For chain 20, if the second type of network traffic matches $ACL_{21}$, it may be directed along segment 21, and if the second type of network traffic matches $ACL_{22}$, it may be directed along segment 22. For chain 30, if the third type of network traffic matches $ACL_{31}$, it may be directed along segment 31.

Heretofore, there are no methods available to determine the packets received by each L4-L7 device (e.g. a firewall) on a per segment/chain/partition basis. Customers/network users are only able to obtain the total count of packets sent from the switch to the appliance.

Presented herein are techniques to allow users to obtain detailed analytics of the traffic received and sent by each appliance. This is achieved without any software or hardware change on the appliance. As will become apparent from the following, the switch is configured to monitor the traffic for each segment, for each chain, for each element of the chain, and for each device group and for each port group. A port group is a group of ports/interfaces on a switch and is relevant at L2. A device group is a group of IP addresses and is relevant at L3.

Specific examples, many of which are described in further detail hereinafter, include:
Traffic per segment, per chain
Traffic per segment, per element
Traffic per segment, per device group
Total traffic per chain
Total traffic per device group (for the L3 part of the chain)
Total traffic per port group (for the L2 part of the chain)
Total traffic through each element
Total traffic per chain, per device group
Total traffic per element, for each chain Referring back to FIG. 1, the switch 110 includes a segmented service chain analytics module 130 that enables generating analytics of network traffic on a per segment/chain/partition basis by monitoring hit counters of the ACLs for each segment of each of the chains. The segmented service chain analytics module 130 may include software-based (or hardware-based) counters that count the number of matches to ACLs associated with each segment of each chain.

For instance, as shown in FIG. 2A, a match with $ACL_{11}$ may trigger (a counter to increment for) count 1, a match with $ACL_{12}$ may (a counter to increment for) count 2, a match with $ACL_{13}$ may (a counter to increment for) count 3, and so on. The total network traffic in chain 10, for example, may be calculated by summing a number of counts for ACLs of the type $ACL_{1i}$, wherein "i" is any integer. This calculation is represented by the mathematical expression shown in FIG. 2B. The total network traffic forwarded to application 1 may be calculated by summing a number of counts for ACLs of the type $ACL_{i1}$. This calculation is represented by the mathematical expression shown in FIG. 2C.

Figure 4:
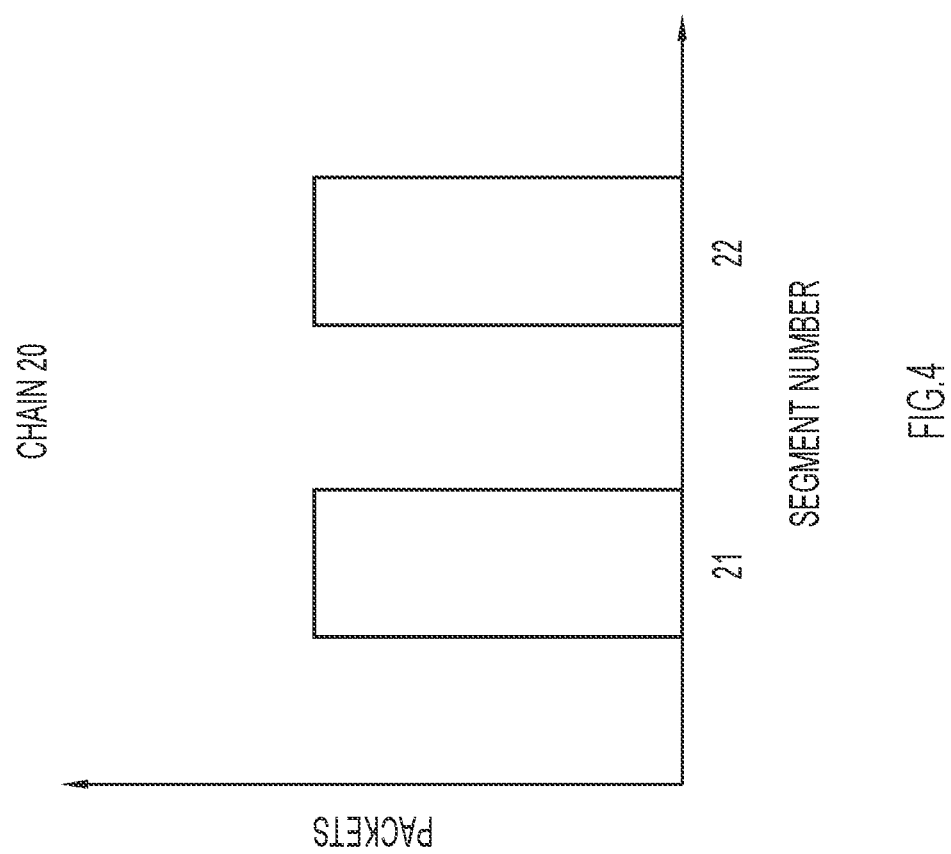
Figure 5:
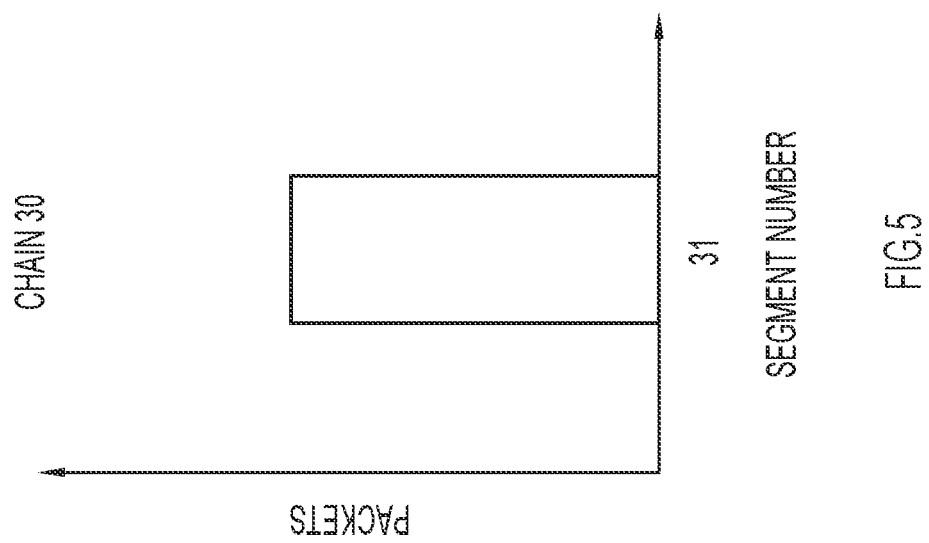

Reference is now made to FIGS. 3-7 for descriptions of the various analytics that may be generated using the techniques presented herein. FIGS. 3-5 illustrates example data for numbers of network packets forwarded along each segment of chains 10, 20, and 30, respectively, in the example network environment shown in FIG. 1. In other words, the segmented service chain analytics module 130 may provide analytics on a per segment, per service chain basis.

FIG. 3 shows a count of packets determined per segment of chain 10 in FIG. 1. FIG. 4 similarly shows a count of packets determined per segment of chain 20 in FIG. 1. FIG. 5 shows a count of packets determined per segment of chain 30 in FIG. 1.

Figure 6:
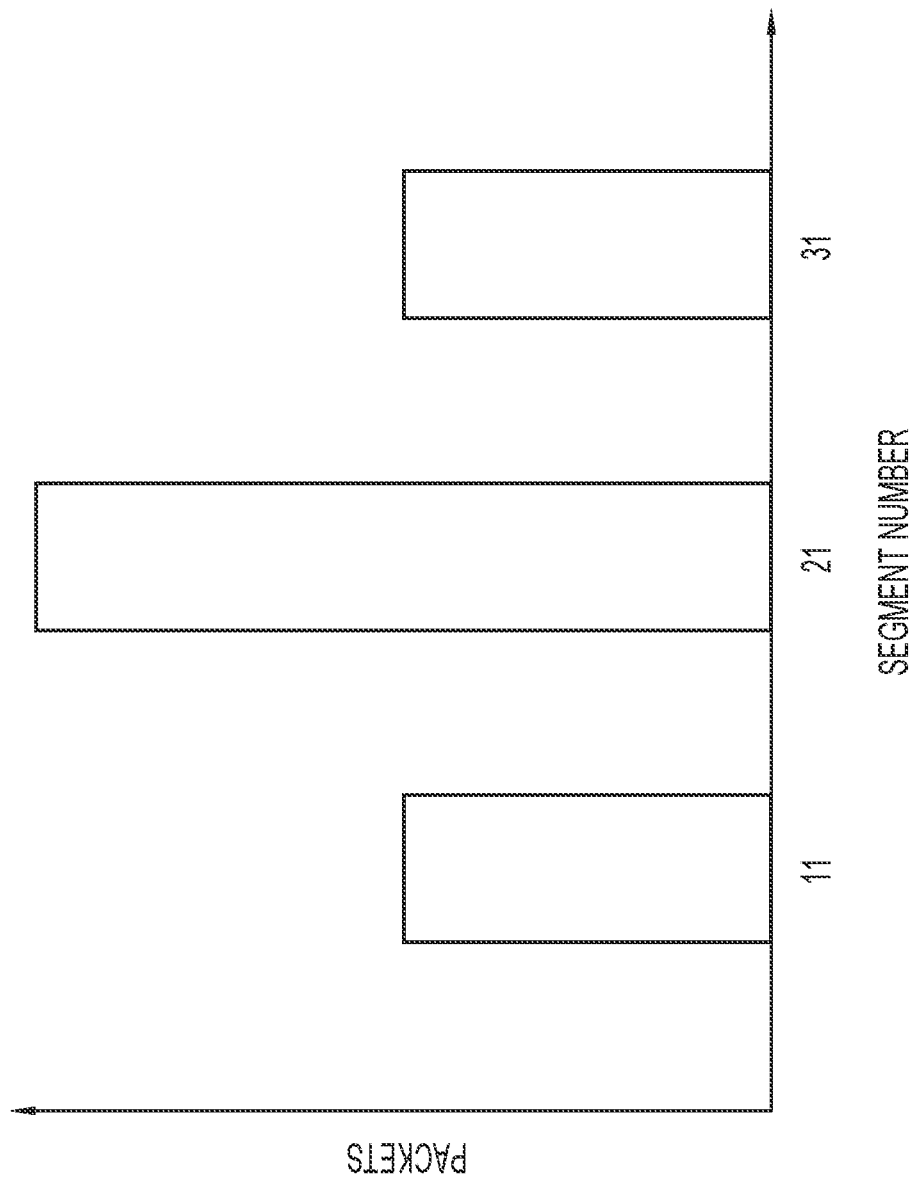

FIG. 6 illustrates example count data for packets forwarded to Application 1 across all three chains. That is, the count for segment 11 is for chain 10, the count for segment 21 is for chain 20 and the count for segment 31 is for chain 30. All of the count data shown in FIG. 6 corresponds to packet count to Application 1 across all service chains, that is, regardless for which chain the packets are directed to Application 1. In other words, the segmented service chain analytics module 130 may provide analytics on a per segment, per application basis.

Figure 7:
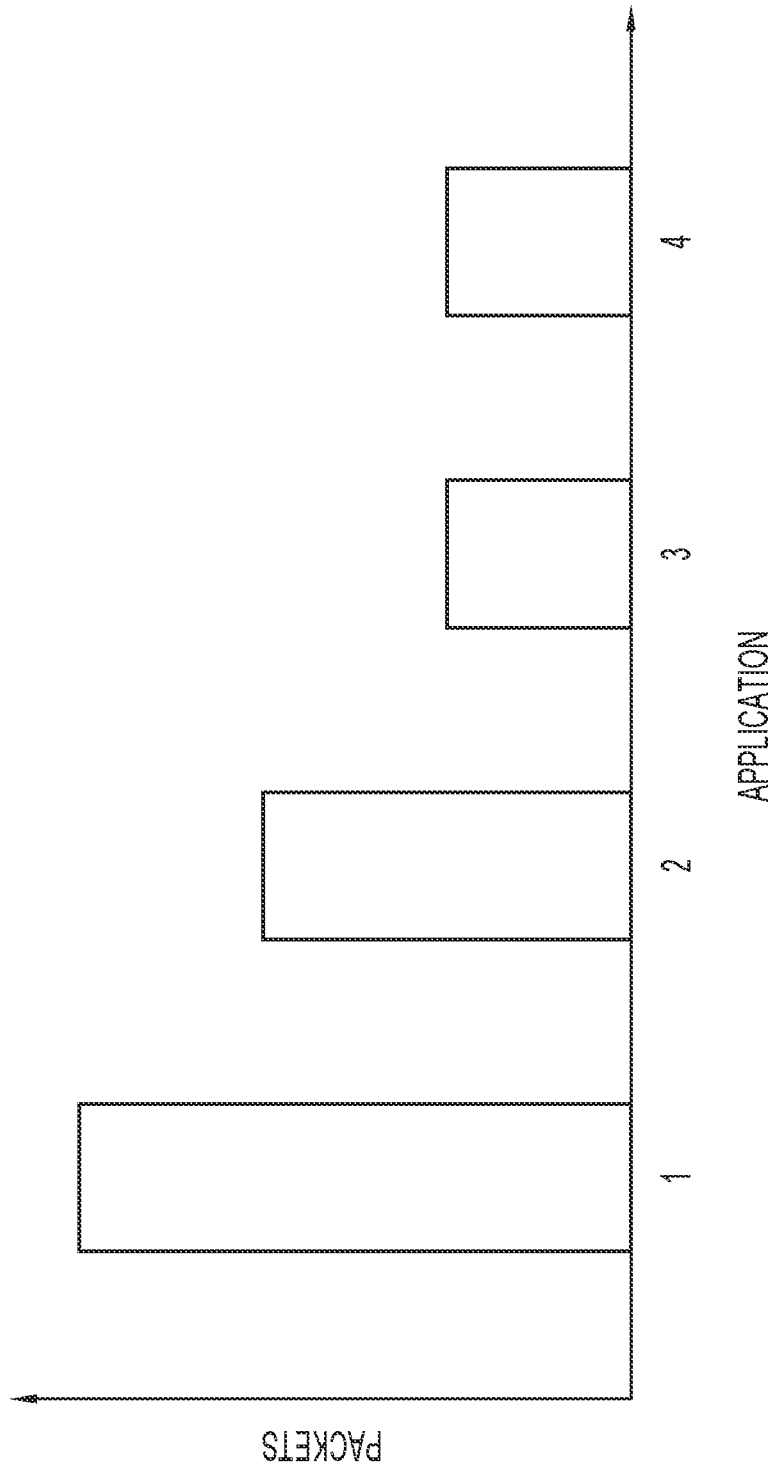

FIG. 7 illustrates example count data of network packets forwarded to Applications 1, 2, 3, and 4, respectively, across all three chains. Thus, FIG. 7 shows how these techniques may generate count data of total packets sent in a given chain.

Figure 8:
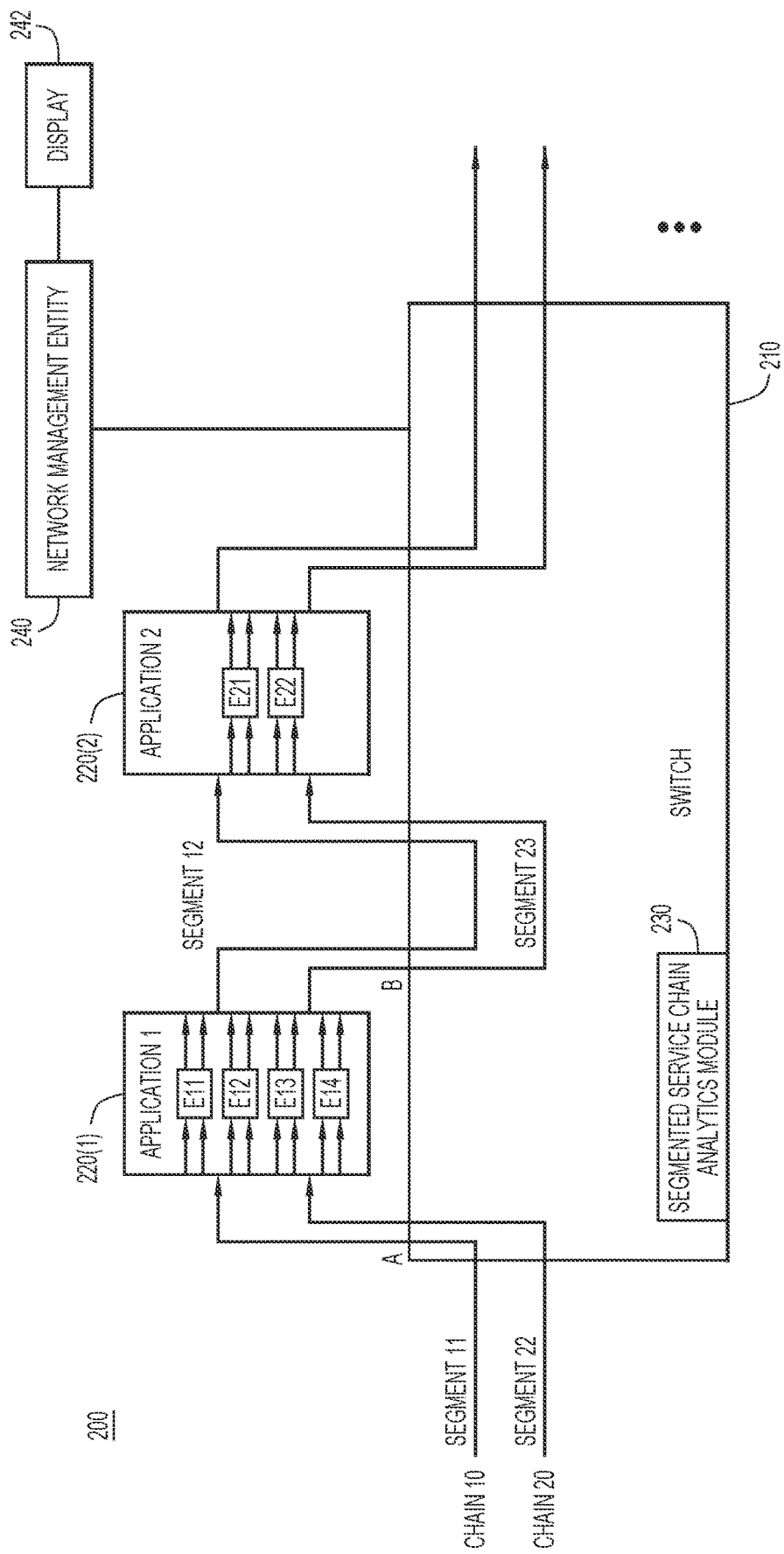
FIG. 8 is a block diagram of a network environment configured for generating analytics for segmented service chaining deployments using multiple redundant appliance elements for an application in a service chain, according to another example embodiment.

FIG. 8 is another block diagram of a network environment 200 for generating analytics for segmented service chains. This network environment 200 includes a switch 210, chains 10 and 20, and Applications 1 and 2 shown at reference numerals 220(1) and 220(2), respectively. Chain 10 includes segment 11 (before Application 1) and segment 12 (between Application 1 and Application 2), and chain 20 includes segment 22 (before Application 1) and segment 23 (between Application 1 and Application 2). Switch 210 includes segmented service chain analytics module 230 which is similar to the segmented service chain analytics module 130 shown in FIG. 1. The network environment 200 further includes network management entity 240, which is similar to the network management entity 140 shown in FIG. 1. Like the arrangement shown in FIG. 1, there is a display 240 associated with the network management entity 240 that can display analytics data obtained from switch 210.

Multiple elements may run Applications 1 and 2 in parallel. In this example, elements E11, E12, E13, and E14 each run/execute Application 1, and elements E21 and E22 run/execute Application 2. In other words, there are four redundant elements that perform the function of Application 1, and two redundant elements that perform the function of Application 2. These elements may be, for example, different containers, virtual machines, and/or physical devices (e.g., firewalls). The switch 210 may load balance network traffic between these elements when the services of an application is needed as part of a service chain. For example, the network traffic of chain 10 and chain 20 may be load balanced between elements E11, E12, E13, and E14 for Application 1, and between elements E21 and E22 for Application 2.

The segmented service chain analytics module 230 may generate provide analytics based on load balancing across these elements for respective applications. For example, FIG. 9 illustrates count data of network packets forwarded to elements E11, E12, E13, and E14 for segment 11 of chain 10 shown in FIG. 8. Similarly, FIG. 10 illustrates count data of packets forwarded to elements E21 and E22 for segment 23 of chain 20 in FIG. 8. Thus, the segmented service chain analytics module 230 may generate analytics on a per chain, per segment, per element basis.

The total network traffic forwarded along a chain may be calculated by summing the total network traffic forwarded through each element for that chain. For example, the total network traffic forwarded along chain 10 is equal to the sum of the network traffic in chain 10 forwarded to elements E11, E12, E13, and E14. The total traffic for chain 10 may be calculated in this manner using the mathematical expression shown in FIG. 11A. The total traffic forwarded along a chain may also be calculated by summing the total network traffic forwarded along all the segments of that chain. For example, the total network traffic forwarded along chain 10 is equal to the total network traffic forwarded along both segment 11 and segment 12. The total traffic for chain 10 may be calculated in this manner using the mathematical expression shown in FIG. 11B.

The total network traffic forwarded to an application may be calculated by summing the total network traffic forwarded to that application for all chains. For example, the total network traffic forwarded to Application 1 is equal to the network traffic forwarded to application in both chain 10 and chain 20. The total traffic for application 1 may be calculated in this manner using the mathematical expression shown in FIG. 11C. The total network traffic forwarded to an application may also be calculated by summing the total network traffic forwarded to the elements of that application for all chains. For example, the total network traffic forwarded to Application 1 is equal to the network traffic forwarded to elements E11, E12, E13, and E14 in both chain 40 and chain 50. The total traffic for Application 1 may be calculated in this manner using the mathematical expression shown in FIG. 11D.

The total network traffic forwarded through an element may be calculated by summing the network traffic forwarded through that element for all chains. For example, the total network traffic forwarded through element E11 is equal to the network traffic forwarded to element E11 in both chain 40 and chain 50. The total traffic for element E11 may be calculated in this manner using the mathematical expression shown in FIG. 11E.

Using the techniques presented herein, a network user (administrator, etc.) using the network management entity 240 (FIG. 8) may expand or shrink a network by adding or removing physical appliances/servers/virtual machines/containers, etc. The network management entity 240 receives the analytics from the switches in the network environment 200 to allow for adding or removing appliance elements based on the analytics. A network can include a number of chains, a number of segments, a number of port-groups, a number of device groups, a number of appliances, a number of ACLs, a number of VLANs, a number of logical/physical ports, etc. These techniques work with all of these combinations. It should be understood that many of the examples presented are greatly simplified (e.g., only 2 chains and 4 appliances) for purposes of this disclosure, but it should be appreciated that real-world network deployments may have numerous more chains and appliances.

Figure 12A:
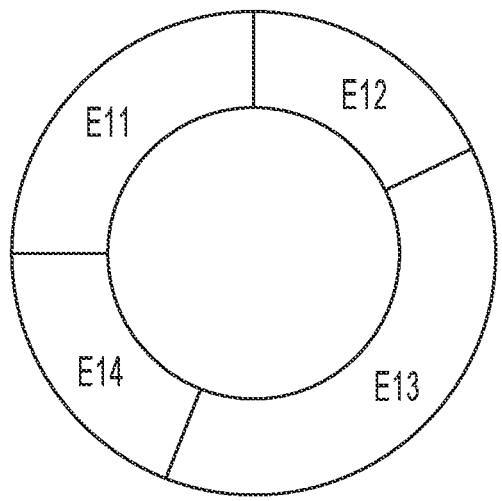
FIGS. 12A and 12B illustrate display examples of analytics related to load balancing to different appliance elements, according to an example embodiment.
Figure 12B:
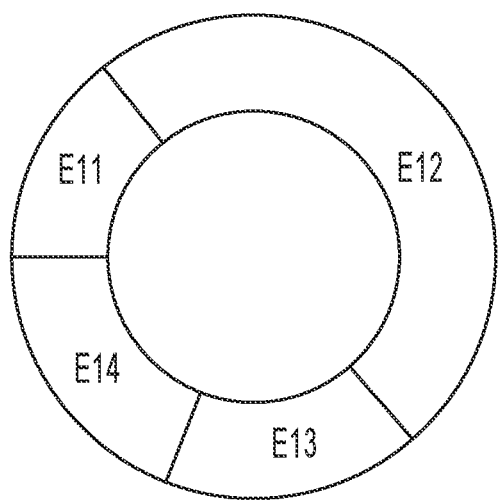

Using the network environment 200 of FIG. 8 as an example, the traffic distribution among redundant elements for a given Application for a given chain may be computed. FIG. 12A shows how traffic is load-balanced to each element E11, E12, E13, and E14 for Application 1 for chain 10. The same can be generated to determine how traffic is load-balanced to each element E11, E12, E13, and E14 for Application 1 for chain 20, as shown in FIG. 12B. FIGS. 12A and 12B show how traffic to the elements E11, E12, E13, and E14 may be load-balanced differently for chain 10 and chain 20.

Figure 13:
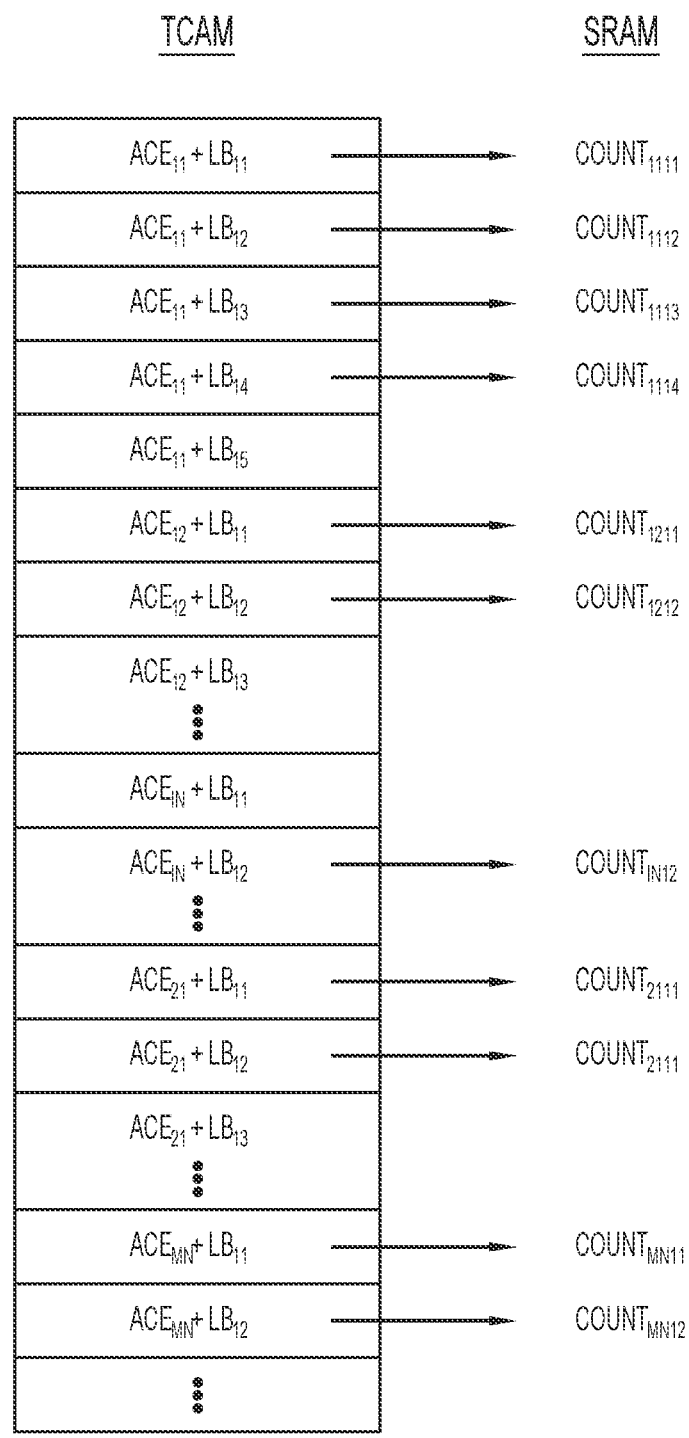
FIG. 13 is an example of hardware table entries at a point of the network environment of FIG. 8, according to an example embodiment.

In order to derive the information depicted by FIGS. 12A and 12B, the segmented service chain analytics module 230 maintains counters for each hardware table entry at each point in the switch 210. FIG. 8 shows points A and B with respect to network switch 210. For example, for hardware table entries at point A may be as shown in FIG. 13.

In the example shown in FIG. 8, device group $DG_{11}$ has elements E11 to E14 and device group $DG_{12}$ has elements E21 and E22. Chain 10 has $ACE_{11}$ to $ACE_{1N}$ and Chain M0 has $ACE_{M1}$ to $ACE_{MN}$.

Each chain segment is identified by an ACL. Each ACL has one or more Access Control Entries (ACEs). ACLs filter traffic as it passes through a switch and permit or deny packets crossing specified interfaces. An ACL is a sequential collection of permit and deny conditions that apply to packets. When a packet is received on an interface, the switch compares the fields in the packet against any applied ACLs to verify that the packet has the required permissions to be forwarded, based on the criteria specified in the access lists. One by one, it tests packets against the conditions in an access list.

An ACL contains an ordered list of ACEs. Each ACE specifies a permit or a deny action and a set of conditions the packet needs to meet in order to match the ACE. The meaning of permit or deny depends on the context in which the ACL is used.

Hardware or software counters are maintained for each hardware entry. Software running on the switch creates these hardware entries. The segmented service chain analytics module 230 periodically reads these counters and executes the appropriate calculations. When a packet is received, the hardware updates the counter at each point on the switch of interest, such as at point A and at point B of the switch 210 shown in FIG. 8.

Each ACE is combined with a load-balance (LB) entry. This allows the segmented service chain analytics module 230 to obtain per element, per chain traffic analytics. Thus, $LB_{11}$ means load balance to segment 11, and so on.

Using these techniques, to compute the total traffic through segment 11, the computation shown in FIG. 14A is used. This would be done for traffic at point A on the switch 210 shown in FIG. 8.

To compute the total traffic through element 11, for chain 10, the computation shown in FIG. 14B is used. This assumes only one bucket is created per element. If more than one bucket is created for each element, then the computation to be made is shown in FIG. 14C.

To compute the total traffic through the device group (which consists of elements E11 to E15), for all chains combined, the computation shown in FIG. 14D is used.

To compute the total traffic through element 11 for all chains combined the computation shown in FIG. 14E is used.

The segmented service chain analytics module 230 software maintains which buckets are mapped to which element, which chains are mapped to which ACEs, which device groups are mapped to which elements, and so on.

Displaying Analytics

The display of the number of packets passing through different chains for a particular instance may be configurable. An example CLI command is defined below.

| Command | Purpose |
| --- | --- |
| show analytics per-acl per-node | Displays the live traffic data going through various transparent devices. Use the per-acl argument to display packet counters for a particular chain. Use the per-node argument to display packet counters for a particular node. |

Still another example for configuring analytics is as follows.

Switch# sh catena analytics per-acl per-node

Instance name: ins1
Chain 10

| Sequence number (Seqno) | Node | # Packets |
| --- | --- | --- |
| 10 | dg1 | 1500 |
| 20 | dg2 | 1500 |
| 30 | dg3 | 1500 |

Total packets per-node for all chains

| Node | Total Packets |
| --- | --- |
| dg1 | 1500 |
| dg2 | 1500 |
| dg3 | 1500 |

Instance name: ins2
Chain 10

| Sequence number (Seqno) | Node | # Packets |
| --- | --- | --- |
| 10 | dg1 | 1000 |
| 20 | dg2 | 1000 |

Total packets per-node for all chains

| Node | Total Packets |
| --- | --- |
| dg1 | 1000 |
| dg2 | 1000 |

Figure 15:
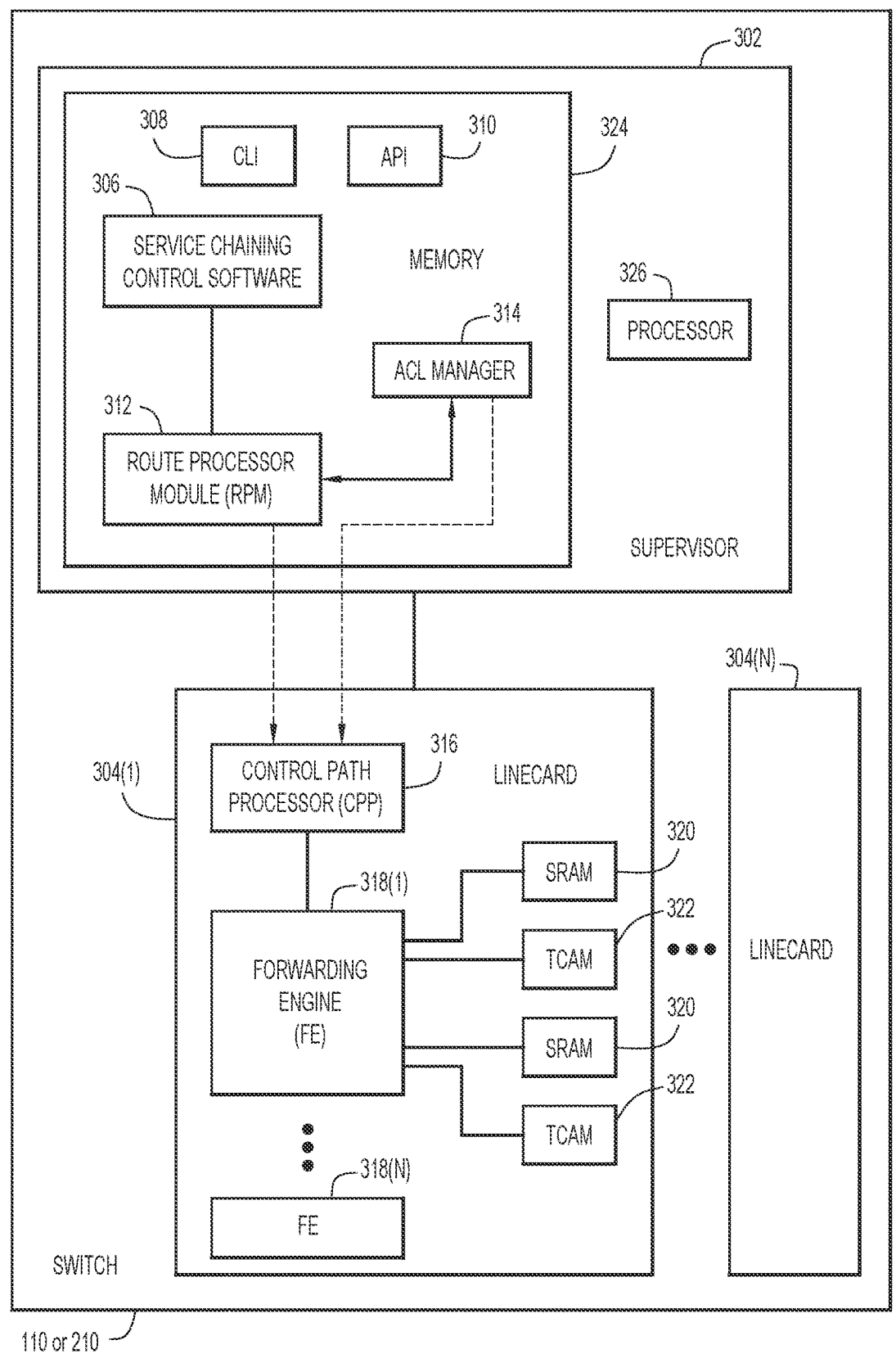
FIG. 15 is a block diagram of a network device (e.g., switch) configured for generating analytics for segmented service chains, according to an example embodiment.

FIG. 15 is a block diagram of an example switch 110 or 210 configured to perform the segmented analytics techniques presented herein, in accordance with an example embodiment. The switch 110/210 includes a supervisor module 302 and a plurality of linecards 304(1)-304(N). The supervisor module 302 includes various software modules, including a service chaining module 306. The service chaining module 1006 is configured to communicate with a user interface 308 (e.g., Command Line Interface (CLI)), an Application Programming Interface (API) 310 to make the CLI available outside of the switch 110/210 (e.g., Nx-API), and a Route Process Manager (RPM) 312 configured to communicate with an ACL manager 312. The linecards 304(1)-304(N) each include a Control Path Processor (CPP) 316 configured to program a plurality of Forwarding Engines (FEs) 318(1)-318(N), which are hardware ASICs. Each FE in a linecard 304(i) is associated with multiple instances of Static Random Access Memories (SRAMs) 320 and TCAMs 322.

The service chaining module 306 may be configured to perform selective traffic redirection based on ACL configuration, and may perform the operations of the load balancing module 112 or 212 shown in FIGS. 1 and 8. The service chaining module 306 may perform the techniques described herein by causing the RPM 312 and ACL manager 314 to configure the linecards 304(1)-304(N) by communicating with the CPP 316 of each linecard. The CPP 316 may program the FEs in accordance with the examples provided herein. The FEs communicate with TCAMs 322, which may store respective match ACLs, and the SRAM 320 may store the action to be taken if there is a match (e.g., to which switch interface (to which an application is connected) to forward a network packet).

The software modules on the supervisor 302 may be implemented (include instructions encoded) on at least one memory 324 and the software modules are executed by at least one processor 326. The memory 324 may comprise read only memory (ROM), random access memory (RAM), magnetic disk storage media devices, optical storage media devices, flash memory devices, electrical, optical, or other physical/tangible memory storage devices. Thus, in general, the memory 324 may comprise one or more tangible (non-transitory) computer readable storage media (e.g., a memory device) encoded with software comprising computer executable instructions and when the software is executed (by the controller/processor) it is operable to perform the operations described herein.

Figure 16:
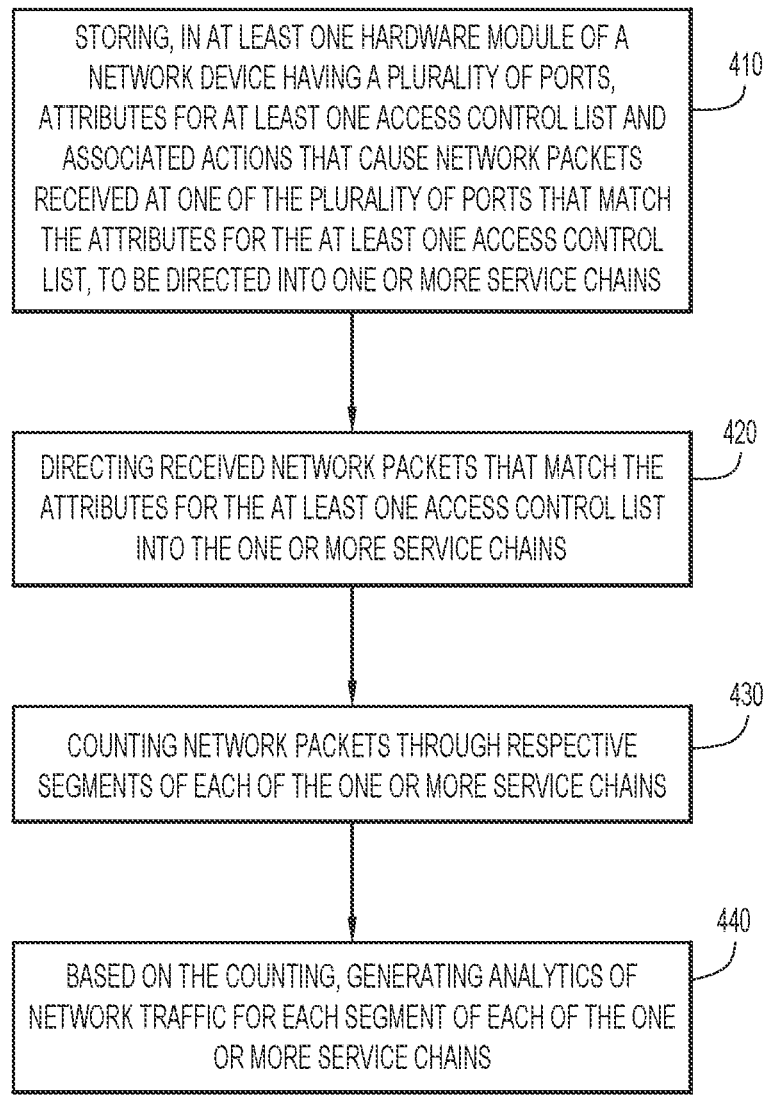
FIG. 16 is a flow chart depicting a method for generating analytics for segmented service chains, according to an example embodiment.

Reference is now made to FIG. 16. FIG. 16 shows a flow chart for a method 400 in accordance with an example embodiment. The operations of method 400 are performed by execution of service chaining control software 306, which includes the functionality of the segmented service chain analytics module 130 and 230 described above in connection with FIGS. 1 and 8.

At 410, the network device (e.g., switch) having a plurality of ports, stores, in at least one hardware module of the network device, attributes for at least one access control list and associated actions that cause network packets received at one of the plurality of ports that match the attributes for the at least one access control list, to be directed into one or more service chains. Each service chain includes one or more applications and a plurality of segments. Each segment represents a portion of a service chain between an ingress port of the network device to a first application of a service chain, a portion between successively applied applications of a service chain, or a portion between a last application of a service chain and an egress port of the network device.

At 420, the network device directs network packets that match the attributes for the at least one access control list into the one or more service chains.

At 430, the network device counts network packets through respective segments of each of the one or more service chains.

At 440, based on the counting operation 430, the network device generates analytics of network traffic for each segment of each of the one or more service chains.

As described above, an access control list is associated with each segment of each of the one or more service chains. The counting operation 430 may include monitoring hit counters associated with each access control list for each segment for each of the one or more service chains.

As described above in connection with the various figures, the analytics generation operation 440 may include generating one or more of: amount of traffic per segment, per service chain; total traffic per service chain; total traffic per segment across the one or more service chains; and total traffic per application across the one or more service chains.

As shown in FIG. 8 and described in connection with FIG. 8, each application may be served by one of a plurality of redundant appliance elements. In this case, the directing operation 420 further includes load balancing network packets among the plurality of redundant appliance elements for each application. In this case, the counting operation 430 may include counting network packets forwarded to respective redundant appliance elements for each of the one or more applications of the one or more service chains, and the analytics generating operation 440 may include generating, based on the counting, analytics on a per service chain, per segment per appliance element basis. The analytics may further include analytics for one or more of: total traffic per device group and total traffic per port group.

As described above in connection with FIGS. 1 and 8, the analytics generated by a network device may be supplied (transmitted) to a network management entity to allow the network management entity to issue commands for adding or removing appliance elements based on the analytics. Further still, the network device may receive a command (from the network management entity) to output to the network management entity, for display at the network management entity, analytics associated with network traffic traveling through the one or more service chains associated with the network element.

As described above in connection with FIG. 13, each access control list may have one or more access control entries, each access control entry specifying a permit or a deny action and a set of conditions a network packet needs to meet in order to match the access control entry. The counting operation 430 may include counting for each access control entry of each access control list.

The network device may be configured to receive a command (e.g., from network management entity 140 shown in FIG. 1 or 240 shown in FIG. 8) to output to the network management entity, for display, analytics associated with network traffic traveling through the one or more service chains associated with the network element.

In summary, a method is provided comprising: storing, in at least one hardware module of a network device having a plurality of ports, attributes for at least one access control list and associated actions that cause network packets received at one of the plurality of ports that match the attributes for the at least one access control list, to be directed into one or more service chains, each service chain including one or more applications and a plurality of segments wherein each segment represents a portion of a service chain between an ingress port of the network device to a first application of a service chain, a portion between successively applied applications of a chain, or a portion between a last application of a service chain and an egress port of the network device; directing received network packets that match the attributes for the at least one access control list into the one or more service chains; counting network packets through respective segments of each of the one or more service chains; and based on the counting, generating analytics of network traffic for each segment of each of the one or more service chains.

In another form, an apparatus is provided comprising: at least one hardware module of a network device having a plurality of ports, the at least one hardware module configured to store attributes for at least one access control list and associated actions that cause network packets received at one of the plurality of ports that match the attributes for the at least one access control list, to be directed into one or more service chains, each service chain including one or more applications and a plurality of segments wherein each segment represents a portion of a service chain between an ingress port of the network device to a first application of a service chain, a portion between successively applied applications of a chain, or a portion between a last application of a service chain and an egress port of the network device; and a processor configured to communicate with the at least one hardware module and to: direct received network packets that match the attributes for the at least one access control list into the one or more service chains; count network packets through respective segments of each of the one or more service chains; and based on counted network packets, generate analytics of network traffic for each segment of each of the one or more service chains.

In still another form, one or more non-transitory computer readable storage media are provided encoded with software comprising computer executable instructions and when the software is executed operable to perform operations comprising: storing, in at least one hardware module of a network device having a plurality of ports, attributes for at least one access control list and associated actions that cause network packets received at one of the plurality of ports that match the attributes for the at least one access control list, to be directed into one or more service chains, each service chain including one or more applications and a plurality of segments wherein each segment represents a portion of a service chain between an ingress port of the network device to a first application of a service chain, a portion between successively applied applications of a chain, or a portion between a last application of a service chain and an egress port of the network device; directing received network packets that match the attributes for the at least one access control list into the one or more service chains; counting network packets through respective segments of each of the one or more service chains; and based on the counting, generating analytics of network traffic for each segment of each of the one or more service chains.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   storing, in at least one hardware module of a network device having a plurality of ports, attributes for at least one access control list and associated actions that cause network packets received at one of the plurality of ports that match the attributes for the at least one access control list, to be directed into one or more service chains, each service chain defining a path that network traffic follows through the network device and one or more applications, each service chain being segmented into a plurality of segments wherein each segment represents a portion of the path of a service chain between an ingress port of the network device to a first application of a service chain, between successively applied applications of a chain, or between a last application of a service chain and an egress port of the network device;
   directing received network packets that match the attributes for the at least one access control list into the one or more service chains;
   monitoring network traffic on each of the one or more service chains by counting, on a per-segment basis, network packets through each individual segment of each of the one or more service chains such that each segment of each of the one or more service chains has a corresponding packet count; and
   based on the counting, generating analytics of network traffic for each segment of each of the one or more service chains, wherein generating analytics includes summing packet counts of a plurality of segments.

2. The method of claim 1, wherein an access control list is associated with each segment of each of the one or more service chains, and wherein counting comprises monitoring hit counters associated with each access control list for each segment for each of the one or more service chains.

3. The method of claim 2, wherein generating analytics comprises generating one or more of: amount of traffic per segment, per service chain; total traffic per service chain; total traffic per segment across the one or more service chains; and total traffic per application across the one or more service chains.

4. The method of claim 2, wherein each application is served by one of a plurality of redundant appliance elements running the application in parallel, and wherein directing further includes load balancing network packets among the plurality of redundant appliance elements for each application.

5. The method of claim 4, wherein counting further includes counting network packets directed to respective redundant appliance elements for each of the one or more applications of the one or more service chains, and wherein generating analytics further includes generating, based on the counting, analytics on a per service chain, per segment per appliance element basis.

6. The method of claim 5, wherein generating analytics further includes generating analytics for one or more of: total traffic per device group and total traffic per port group.

7. The method of claim 5, further comprising supplying the analytics to a network management entity to allow the network management entity to issue commands for adding or removing appliance elements based on the analytics.

8. The method of claim 2, wherein each access control list has one or more access control entries, each access control entry specifying a permit or a deny action and a set of conditions a network packet needs to meet in order to match the access control entry, and wherein counting comprises counting for each access control entry of each access control list.

9. The method of claim 1, further comprising receiving a command to output to a network management entity, for display, analytics associated with network traffic traveling through the one or more service chains associated with the network element.

10. An apparatus comprising:
    at least one hardware module of a network device having a plurality of ports, the at least one hardware module configured to store attributes for at least one access control list and associated actions that cause network packets received at one of the plurality of ports that match the attributes for the at least one access control list, to be directed into one or more service chains, each service chain defining a path that network traffic follows through the network device and one or more applications, each service chain being segmented into a plurality of segments wherein each segment represents a portion of the path of a service chain between an ingress port of the network device to a first application of a service chain, between successively applied applications of a chain, or between a last application of a service chain and an egress port of the network device; and
    a processor configured to communicate with the at least one hardware module and to:
       direct received network packets that match the attributes for the at least one access control list into the one or more service chains;
       monitor network traffic on each of the one or more service chains by counting, on a per-segment basis, network packets through each individual segment of each of the one or more service chains such that each segment of each of the one or more service chains has a corresponding packet count; and
       based on counted network packets, generate analytics of network traffic for each segment of each of the one or more service chains, wherein analytics of the network traffic include analytics generated by summing packet counts of a plurality of segments.

11. The apparatus of claim 10, wherein an access control list is associated with each segment of each of the one or more service chains, and wherein the processor is configured to generate analytics by monitoring hit counters associated with each access control list for each segment for each of the one or more service chains.

12. The apparatus of claim 11, wherein the processor is configured to generate analytics including one or more of: amount of traffic per segment, per service chain; total traffic per service chain; total traffic per segment across the one or more service chains; and total traffic per application across the one or more service chains.

13. The apparatus of claim 11, wherein each application is served by one of a plurality of redundant appliance elements running the application in parallel, and wherein in directing packets, the processor is configured to load balancing network packets among the plurality of redundant appliance elements for each application.

14. The apparatus of claim 13, wherein the processor is configured to count network packets directed to respective redundant appliance elements for each of the one or more applications of the one or more service chains, and to generate analytics on a per service chain, per segment per appliance element basis.

15. The apparatus of claim 11, wherein the processor is configured to supply the analytics to a network management entity to allow the network management entity to issue commands for adding or removing appliance elements based on the analytics.

16. The apparatus of claim 10, wherein the processor is responsive to a command to output to a network management entity, for display, analytics associated with network traffic traveling through the one or more service chains associated with the network element.

17. One or more non-transitory computer readable storage media encoded with software comprising computer executable instructions and when the software is executed operable to perform operations comprising:
storing, in at least one hardware module of a network device having a plurality of ports, attributes for at least one access control list and associated actions that cause network packets received at one of the plurality of ports that match the attributes for the at least one access control list, to be directed into one or more service chains, each service chain defining a path that network traffic follows through the network device and one or more applications, each service chain being segmented into a plurality of segments wherein each segment represents a portion of the path of a service chain between an ingress port of the network device to a first application of a service chain, between successively applied applications of a chain, or between a last application of a service chain and an egress port of the network device;
directing received network packets that match the attributes for the at least one access control list into the one or more service chains;
monitoring network traffic on each of the one or more service chains by counting, on a per-segment basis, network packets through each individual segment of each of the one or more service chains such that each segment of each of the one or more service chains has a corresponding packet count; and
based on the counting, generating analytics of network traffic for each segment of each of the one or more service chains, wherein analytics of the network traffic include analytics generated by summing packet counts of a plurality of segments.

18. The non-transitory computer readable storage media of claim 17, wherein an access control list is associated with each segment of each of the one or more service chains, and wherein the instructions operable for counting comprise instructions operable for monitoring hit counters associated with each access control list for each segment for each of the one or more service chains.

19. The non-transitory computer readable storage media of claim 18, wherein the instructions operable for generating analytics include instructions operable for generate one or more of: amount of traffic per segment, per service chain; total traffic per service chain; total traffic per segment across the one or more service chains; and total traffic per application across the one or more service chains.

20. The non-transitory computer readable storage media of claim 18, wherein each application is served by one of a plurality of redundant appliance elements running the application in parallel, and wherein the instructions operable for directing include instructions for load balancing network packets among the plurality of redundant appliance elements for each application.

* * * * *